United States Patent
Ebergen et al.

(10) Patent No.: US 7,660,842 B2
(45) Date of Patent: Feb. 9, 2010

(54) METHOD AND APPARATUS FOR PERFORMING A CARRY-SAVE DIVISION OPERATION

(75) Inventors: Josephus C. Ebergen, San Francisco, CA (US); Ivan E. Sutherland, Santa Monica, CA (US); Danny Cohen, Pacific Palisades, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 561 days.

(21) Appl. No.: 10/436,577

(22) Filed: May 12, 2003

(65) Prior Publication Data

US 2004/0230635 A1 Nov. 18, 2004

(51) Int. Cl.
*G06F 7/52* (2006.01)
(52) U.S. Cl. .................................... 708/650
(58) Field of Classification Search .......... 708/650–656
See application file for complete search history.

(56) References Cited

U.S. PATENT DOCUMENTS

| | | | |
|---|---|---|---|
| 4,939,686 A | | 7/1990 | Fandrianto |
| 5,132,925 A | * | 7/1992 | Kehl et al. ................... 708/653 |
| 5,258,944 A | | 11/1993 | Smith |
| 5,272,660 A | | 12/1993 | Rossbach |
| 5,386,376 A | | 1/1995 | Girard et al. |
| 5,404,324 A | | 4/1995 | Colon-Bonet |
| 5,416,733 A | * | 5/1995 | Chen et al. ................... 708/650 |
| 5,798,955 A | * | 8/1998 | Matsubara ................... 708/490 |
| 5,862,059 A | * | 1/1999 | Matula et al. ................ 708/270 |
| 5,870,323 A | | 2/1999 | Prabhu et al. |
| 5,954,789 A | | 9/1999 | Yu et al. |
| 6,549,926 B1 | | 4/2003 | Kalambur et al. |
| 6,751,645 B1 | * | 6/2004 | Gorshtein et al. ........... 708/650 |

OTHER PUBLICATIONS

U.S. Patent Application, entitled "Permit for Controlling Access to Services in Protected Memory Systems," to Efrem Lipkin and Theodore C. Goldstein, Filed Jun. 18, 1998, Serial No. Not Yet Assigned.

\* cited by examiner

*Primary Examiner*—Chat C Do
(74) *Attorney, Agent, or Firm*—Park, Vaughan & Fleming LLP

(57) ABSTRACT

One embodiment of the present invention provides a system that performs a carry-save division operation that divides a numerator, N, by a denominator, D, to produce an approximation of the quotient, Q=N/D. The system approximates Q by iteratively selecting an operation to perform based on higher order bits of a remainder, r, and then performing the operation, wherein the operation can include, subtracting D from r and adding a coefficient c to a quotient calculated thus far q, or adding D to r and subtracting c from q. These subtraction and addition operations maintain r and q in carry-save form, which eliminates the need for carry propagation and thereby speeds up the division operation. Furthermore, the selection logic is simpler than previous SRT division implementations, which provides another important speed up.

8 Claims, 7 Drawing Sheets

METHOD AND APPARATUS FOR PERFORMING A CARRY-SAVE DIVISION OPERATION

BACKGROUND

1. Field of the Invention

The present invention relates to techniques for performing mathematical operations within computer systems. More specifically, the present invention relates to a method and an apparatus for efficiently performing a carry-save division operation in circuitry within a computer system.

2. Related Art

In order to keep pace with continually increasing microprocessor clock speeds, computational circuitry within the microprocessor core must perform computational operations at increasingly faster rates. One of the most time-consuming computational operations that can be performed within a computer system is a division operation. A division operation involves dividing a numerator, N, by a denominator, D, to produce a resulting approximation of quotient, Q, wherein Q=N/D.

Computer systems often perform division operations using a variant of the SRT technique, which iteratively performs subtraction operations on a remainder, R, to retire a fixed number of quotient bits in each iteration. (The SRT technique is named for Sweeny, Robertson and Tocher, who each independently developed the technique at about the same time.)

Unfortunately, each iteration of the SRT division technique involves performing addition and/or subtraction operations that require time-consuming carry completions and selection logic to decide which operations to perform. Hence, hardware implementations of the SRT division technique tend to be relatively slow.

What is needed is a method and an apparatus for performing a division operation that takes less time than the SRT technique.

SUMMARY

One embodiment of the present invention provides a system that performs a carry-save division operation that divides a numerator, N, by a denominator, D, to produce an approximation of the quotient, Q=N/D. The system approximates Q by iteratively selecting an operation to perform based on higher order bits of a remainder, r, and then performing the operation, wherein the operation can include, subtracting D from r and adding a coefficient c to a quotient calculated thus far q, or adding D to r and subtracting c from q. These subtraction and addition operations maintain r and q in carry-save form, which eliminates the need for carry propagation and thereby speeds up the division operation. Furthermore, the selection logic is simpler than previous SRT division implementations, which provides another important speed up.

In a variation on this embodiment, maintaining r in carry-save form involves maintaining a sum component, $r_s$, and a carry component, $r_c$.

In a further variation, maintaining q in carry-save form involves maintaining a sum component, $q_s$, and a carry component, $q_c$.

In a further variation, the system initializes r, q and c by setting $r_s$=R and $r_c$=0; setting $q_s$=0 and $q_c$=0; and setting c=1.

In a further variation, after the iterations are complete, the system performs a carry completion addition that adds $q_s$ and $q_c$ to generate q in non-redundant form.

In a variation on this embodiment, the operation can include multiplying both $r_s$ and $r_c$ by 2 and dividing c by 2.

In a variation on this embodiment, the operation can include multiplying both $r_s$ and $r_c$ by 2, dividing c by 2, and inverting the most significant bits of $r_s$ and $r_c$.

In a variation on this embodiment, the operation can include multiplying both $r_s$ and $r_c$ by 4, dividing c by 4 and then inverting the most significant bits of $r_s$ and $r_c$.

In a variation on this embodiment, the operation can include subtracting D from $r_s$ and $r_c$, adding c to $q_s$ and $q_c$, multiplying both $r_s$ and $r_c$ by 2, dividing c by 2, and then inverting the most significant bits of $r_s$ and $r_c$.

In a variation on this embodiment, the operation can include subtracting 2D from $r_s$ and $r_c$, adding 2c to $q_s$ and $q_c$, multiplying both $r_s$ and $r_c$ by 2, dividing c by 2, and then inverting the most significant bits of $r_s$ and $r_c$.

In a variation on this embodiment, the operation can include adding D to $r_s$ and $r_c$, subtracting c from $q_s$ and $q_c$, multiplying both $r_s$ and $r_c$ by 2, dividing c by 2, and then inverting the most significant bits of $r_s$ and $r_c$.

In a variation on this embodiment, the operation can include adding 2D to $r_s$ and $r_c$, subtracting 2c from $q_s$ and $q_c$, multiplying both $r_s$ and $r_c$ by 2, dividing c by 2, and then inverting the most significant bits of $r_s$ and $r_c$.

DETAILED DESCRIPTION

Figure 1:
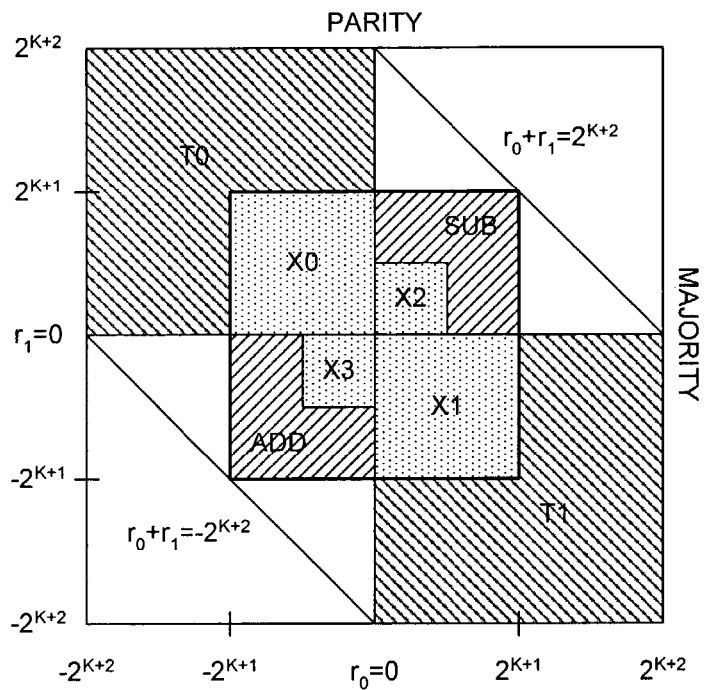
FIG. 1 illustrates a set of regions defined by higher-order bits of sum and carry words for the remainder in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The division operation computes an approximation for $Q=C*R/D$, where Q is the quotient, D is the denominator (divisor) and $C*R$ is the numerator (dividend). Normally for a division we have $C=1$. Here, however, the task is to compute the result of a multiplication and a division at the same time. Notice that, when we choose $D=1$, the technique computes the multiplication $C*R$.

Because we are interested in a hardware implementation, we make some assumptions about the ranges of C, R, and D. We assume that, $$C \in [0, 2^K) \quad (1)$$

$$R \in [-2^{K+1}, 2^{K+1}) \quad (2)$$

$$D \in [2^K, 2^{K+1}) \quad (3)$$

For binary representations of C, R, and D, these assumptions can be satisfied by performing the appropriate shift operations before the start of the division operation. Notice that for these assumptions Q will be in the same range as R, that is, $Q=C*R/D \in [-2^{K+1}, 2^{K+1})$. Finally, we require that the error in our approximation of the quotient Q is less than $2^{-L}$.

Technique A

The formula $Q*D=C*R$ expresses the desired relation between Q, D, C, and R. In our first technique, called Technique A, we use variables q, r, and c. The invariant for these variables is, $$q*D+c*r=C*R \quad (4)$$

wherein the variable q represents the quotient calculated "thus far," and r represents the remainder "thus far."

Technique A appears below. (Note that conditions B0 through B3 are defined later.)

```
q:=0; c:=C; r:=R; n:=0;
    while B0 do {
        if B1 then {r:=r*2; c:=c/2; n:=n+1}
        elseif B2 then {r:=r-D; q:=q+c}
        elseif B3 then {r:=r+D; q:=q-c}
    }
```

When we represent r and c by binary numbers, we can easily implement the statements $r:=r*2$; $c:=c/2$ by shift operations on r and c. We use the variable n to count the number shifts on c.

The initialization $q:=0$; $c:=C$; $r:=R$ establishes invariant (4) before the start of the iterations in Technique A.

Furthermore, each of the statements $r:=r*2;\ c:=c/2$ $r:=r-D;\ q:=q+c$ $r:=r+D;\ q:=q-c$ maintains invariant (4), irrespective of the conditions B0 through B3. For example, if (4) holds before statement $r:=r+D$; $q:=q-c$, then after execution of this statement we have $$(q-c)*D+c*(r+D)=q*D+c*r$$

Thus, invariant (4) also holds after the statement.

Note that B0 through B3 can be selected in a number of different ways. The following choices yield Technique A.

$$B0 = n \leq K+L+1$$

$$B1 = (-D < r < D)$$

$$B2 = (r \geq D)$$

$$B3 = (r \leq -D)$$

The choice for the termination condition B0 can be explained as follows. Because of the initial conditions on R and D and the conditions B1 through B3, Technique A has as additional invariant $$|r| < 2*D \quad (5)$$

Notice that none of the statements in the repetition violates invariant (5).

Technique A is guaranteed to terminate, because each repetition step without a shift operation is followed by a repetition step with a shift operation. In other words, a repetition step with a subtraction and addition creates a state where condition B1 applies. Consequently, n increases at least every two repetition steps, and thus Technique A will terminate.

Assuming a random distribution of C and R, the average number of additions and subtractions per shift is 0.5. Phrased differently, for each addition or subtraction, there will be two shifts on average.

Technique B

Technique B arises when we choose more efficient conditions for B1 through B3. Testing whether $r<D$ requires a comparison, which in general incurs many gate delays. However, testing whether $r \in [-2^K, 2^K)$ for some K can be much faster for a two's complement representation of r, in particular if K is the position of the most significant or second-most-significant bit.

Technique B maintains as an invariant not only property (4), but also the property $$r \in [-2^{K+1}, 2^{K+1}) \quad (6)$$

The choices for B0 through B3 are as follows. Recall that B0 is the termination condition, B1 is the condition for doubling r, B2 is the condition for subtracting D, and B3 is the condition for adding D.

$$B0 = n \leq K+L+1$$

$$B1 = r \in [-2^K, 2^K)$$

$$B2 = r \in [2^K, 2^{K+1})$$

$$B3 = r \in [-2^{K+1}, -2^K)$$

Recall that property (4) remains an invariant of Technique B, because the choices for B0 through B3 have no effect on the validity of the invariant. Secondly, notice that, with these choices for B1 through B3, none of the statements in Technique B violates invariant (6).

Our termination condition B0 may remain the same, because invariant (6) and the initial condition $2^K \leq D$ guarantee that $|r| \leq 2*D$ is also an invariant of Technique B. Accordingly, the reasoning about the termination conditions for Technique A also applies to Technique B.

Although the choice for termination condition B0 has not changed, the choices for B1 through B3 have changed and have an effect on the efficiency of the technique. Tests B1 through B3 for technique B are much faster than the tests for Technique A. Moreover, Technique B may execute fewer additions or subtractions on average per shift operation. When $D=2^K$, the average number of additions and subtractions per shift is ½, as for Technique A. When D approaches $2^{K+1}$, the average number of additions and subtractions per shift turns out to approach ½ as well. However, when $D=3*2^{K-1}$, the average number of additions and subtractions per shift turns out to be ⅓. These values are the extremes for the average number of additions and subtractions per shift for Technique B and a fixed D. Consequently, the average number of additions and subtractions per shift for any D will be somewhere between ½ and ⅓.

Note that Technique B is a slight generalization of the well-known SRT division technique. This generalization involves considering a general C instead of C=1.

Technique C

The third technique attempts to reduce the execution time even further by speeding up the additions and subtractions. The addition and subtraction operations are the only operations that may have room for a possible speed up. This is because Technique A already has an efficient termination condition, and Technique B already speeds up the process of selecting between a shift, an addition, or a subtraction as the next operation.

Technique C achieves a speed-up by keeping the remainder r and the quotient q in carry-save form. That is, instead of a single remainder r and a single quotient q, we have a pair, $r_0$, $r_1$, and a pair, $q_0$, $q_1$, where $r_0+r_1=r$ and $q_0+q_1=q$. The pairs $r_0$, $r_1$ and $q_0$, $q_1$ are produced by full carry-save adders, each of which produce a sum bit and a carry bit, also called the parity and majority bit respectively. One variable, $r_0$, represents all the sum bits and the other variable, $r_1$, represents all the carry bits. By storing r in carry-save form, the implementation does not need to resolve the carry bits for each addition, which is a computation that takes an amount of time proportional to the logarithm of the number of bits in the worst case.

The invariant for the division operation is as follows:

$$(q_0+q_1)*D+c*(r_0+r_1)=C*R \qquad (7)$$

The following ranges apply for $r_0$ and $r_1$:

$$r_0 \in [-2^{K+2}, 2^{K+2}) \text{ and } r_1 \in [-2^{K+2}, 2^{K+2})$$

Furthermore, we have as an invariant the following property.

$$r_0+r_1 \in [-2^{K+2}, 2^{K+2}) \qquad (8)$$

FIG. 1 shows all points $(r_0, r_1)$ within the required boundaries. The complete region in FIG. 1 between the lines $r_0+r_1=-2^{K+2}$ and $r_0+r_1=2^{K+2}$ is divided into basically six subregions: (1) the region T0; (2) the region T1; (3) the union of the regions X0, X1, X2, and X3; (4) the region ADD; (5) the region SUB; and (6) the rest. Each of the first five regions causes a different operation to be performed on $r_0$, $r_1$ and the other variables in Technique C. The rest region turns out not to play a role.

We assume that each region includes the lower bounds for the $r_0$ and $r_1$ coordinates and excludes the upper bounds. This choice turns out to fit well with a two's complement representation of $r_0$ and $r_1$.

Technique C uses a carry-save addition add (x,y,z) that takes three inputs and returns two results $add_0(x,y,z)$ and $add_1(x,y,z)$. The function add satisfies $$add_0(x,y,z)+add_1(x,y,z)=x+y+z \qquad (9)$$

where $add_0$ is the parity function, or "sum" function, and $add_1$ is the majority function, or "carry" function. We denote in Technique C an assignment using this addition function as $$r0,r1:=add(x,y,z)$$

The meaning of this notation is that $r_0$ is assigned the value $add_0(x,y,z)$ and $r_1$ is assigned the value $add_1(x,y,z)$.

Technique C appears below. We have used the labels of FIG. 1 to specify the conditions in the technique. The notation X0++X1 denotes the union of the regions X0 and X1.

Technique C:

```
q0:=0; q1:=0; c:=C; r0:=R; r1:=0; n:=0;
while (n <= K+L+2) do {
    if ((r0,r1) in X0++X1++X2++X3) then
        {r0,r1:=r0*2,r1*2; c:=c/2; n:=n+1}
    elseif ((r0,r1) in SUB) then
        {r0,r1:=add(r0,r1,-D); q0,q1:=add(q0,q1, c)}
    elseif ((r0,r1) in ADD) then
        {r0,r1:=add(r0,r1, D); q0,q1:=add(q0,q1,-c)}
    elseif ((r0,r1) in T0) then
        {r0,r1:=r0+2^(K+1),r1-2^(K+1)}
    elseif ((r0,r1) in T1) then
        {r0,r1:=r0-2^(K+1),r1+2^(K+1)}
}
```

Note that any point in region T0 is translated over $(2^{K+1}, -2^{K+1})$, whereas any point in region T1 is translated over $(-2^{K+1}, 2^{K+1})$.

Stay Within Bold Inner Square

The first optimization to Technique C is the combination of some repetition steps such that the result of each repetition step is again a point in the bold inner square of FIG. 1. The bold inner square is the union of the regions X0, X1, X2, X3, SUB, and ADD. If each repetition step yields points that are within the inner bold square, we can eliminate the tests for the translations from the technique. This does not mean that no translations occur. In fact, any necessary translations are merged into other repetition steps.

Another benefit of staying in the inner square is that in a two's complement representation of each point in the inner square the two most significant bits are always the same. In other words, we can just as well omit the most significant bit.

The only operations in Technique C that return points outside the bold inner square are doublings from regions X0 and X1, additions from region ADD, and subtractions from region SUB. Let us look at the doublings from regions X0 and X1 first. Notice that after executing a doubling for the regions X0 and X1, Technique C performs a translation for points in region T0. Instead of translating any point in region T0, we can just as well translate any point in region T0 and X0. In other words, we can translate any point that is a result of a doubling from a point in region X0. Any doubling of region X0 followed by a translation over $(2^{K+1}, -2^{K+1})$ in effect expands region X0 to the bold inner square. Similarly, any doubling of region X1 followed by a translation over $(2^{K+1}, -2^{K+1})$ in effect expands region X1 to the bold inner square.

Figure 2:
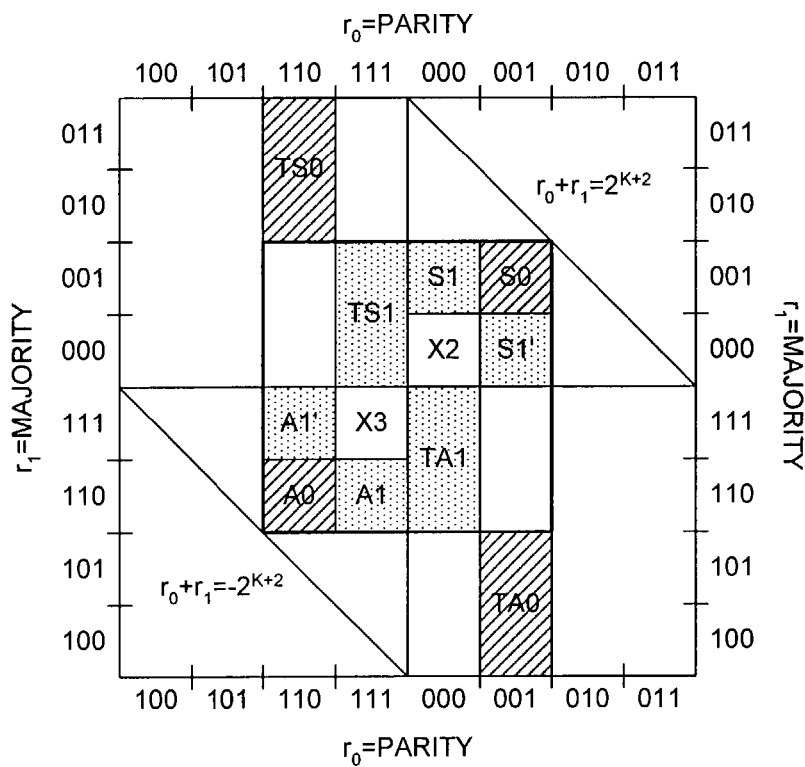
FIG. 2 illustrates the effect of carry-save addition and subtraction operations in accordance with an embodiment of the present invention.

Now let us look at additions and subtractions. Note that carry-save additions and subtractions may return points outside the bold inner square. For example, subtracting D from any point in region S0 in FIG. 2 returns a point in region TS0, which is outside the bold inner square. Subtracting D from any point in region S1 or S1' in FIG. 2, however, returns a point in region TS1, which is inside the bold inner square. Because region TS0 is inside region T0 of FIG. 1, Technique C translates each point in region TS0 to a point in regions S1 or X2. Because TS1 is inside the bold inner square, Technique C does not translate points from region TS1. Notice, however, that if you translate region TS1 over $(2^{K+1}, -2^{K+1})$, the result still ends up inside the inner square. Notice also that this translation does not invalidate any of our invariants (4) and (5). Consequently, if we choose to follow each subtraction of D from any point in region SUB by a translation over ($2^{K+1}$, $-2^{K+1}$), the result ends up inside the bold inner square. For reasons of symmetry, similar remarks can be made for the additions, but this time the translations are over ($2^{K+1}$, $-2^{K+1}$).

The following technique, called Technique D, incorporates the optimizations discussed in this section. Each doubling from X0 or X1 is followed by a translation and each addition or subtraction is followed by a translation. Technique D has an invariant that is stronger than invariant (5), viz., ($r_0$, $r_1$) is always contained within the bold inner square, where lower bounds are included and upper bounds are excluded, in formula, $$r_0 \epsilon [-2^{K+1}, -2^{K+1}) \text{ and } r_1 \epsilon [-2^{K+1}, -2^{K+1}).$$

Because of this last invariant, we can eliminate the tests for translations entirely. A description of Technique D appears below. Note that we use the same labels as for the regions of FIG. 1. As before, the notation X2++X3 denotes the union of regions X2 and X3.

---

Technique D:

```
q0:=0;q1:=0;c:=C;r0:=R;r1:=0;n:=0;
while (n<=K+L+2) do {
    if((r0,r1) in X2++X3) then
        {r0,r1:=r0*2,r1*2; c:=c/2; n:=n+1}
    elseif ((r0,r1) in X0) then
        {r0,r1:=r0*2, r1*2; c:=c/2; n:=n+1;
         r0,r1:=r0+2^(K+1),r1-2^(K+1)}
    elseif ((r0,r1) in X1) then
        {r0,r1:=r0*2,r1*2; c:=c/2; n:=n+1;
         r0,r1:=r0-2^(K+1),r1+2^(K+1)}
    elseif ((r0,r1) in SUB) then
        {r0,r1:=add(r0,r1-D);q0,q1:=add(q0,q1, c);
         r0,r1:=r0+2^(K+1),r1-2^(K+1)}
    elseif ((r0,r1) in ADD) then
        {r0,r1:=add(r0,r1, D); q0,q1:=add(q0,q1,-c);
         r0,r1:=r0-2^(K+1),r1+2^(K+1)}
}
```

---

Implementing Translations

If we assume a two's complement representation of K+3 non-fractional bits for $r_0$ and $r_1$, translations over (t,-t) and (-t,t), with $t=2^{K+1}$, to points inside the bold inner square are easy to implement. Both translations amount to inverting the second-most significant bit and, because the results are in the inner square, making the most significant bit equal to the second-most significant bit. Notice that in a binary representation where K+2 and K+1 are the positions of the most and second-most significant bits, the translations over $2^{K+1}$ and $-2^{K+1}$ involve the manipulation of these two most significant bits only.

For a translation over $+2^{K+1}$ to a point in the bold inner square, the two most significant bits change as follows, 10→11 and 11→00.

For a translation over $-2^{K+1}$ to a point in the bold inner square, the two most significant bits change as follows, 01→00 and 00→11.

Notice that the second-most significant bit in each case changes and the most significant bit is a copy of the second-most significant bit.

Because of these observations, we can re-phrase Technique D as follows, again using the region labels of FIG. 1.

---

Technique E:

```
q0:=0; q1:=0; c:=C; r0:=R; r1:=0; n:=0;
while (n <= K+L+2) do {
    if ((r0,r1) in X2++X3) then
        {r0,r1:=r0*2,r1*2; c:=c/2; n:=n+1}
    elseif (r0,r1) in X0++X1) then
        {r0,r1:=r0*2,r1*2; c:=c/2; n:=n+1;
         invert(K+1, r0, r1)}
    elseif ((r0,r1) in SUB) then
        {r0,r1:=add(r0,r1,-D); q0,q1:=add(q0,q1, c);
         invert(K+1, r0, r1)}
    elseif ((r0,r1) in ADD) then
        {r0,r1:=add(r0,r1, D); q0,q1:=add(q0,q1,-c);
         invert(K+1, r0, r1)}
}
```

---

Where invert (K+1, r0, r1) means "invert bit K+1 in $r_0$ and $r_1$ and make bit K+2 equal to bit K+1." Because both translations in Technique D can be implemented in the same way, viz., the inversion of bit K+1, points in regions X0 and X1 undergo the same operations in Technique E.

Figure 3A:
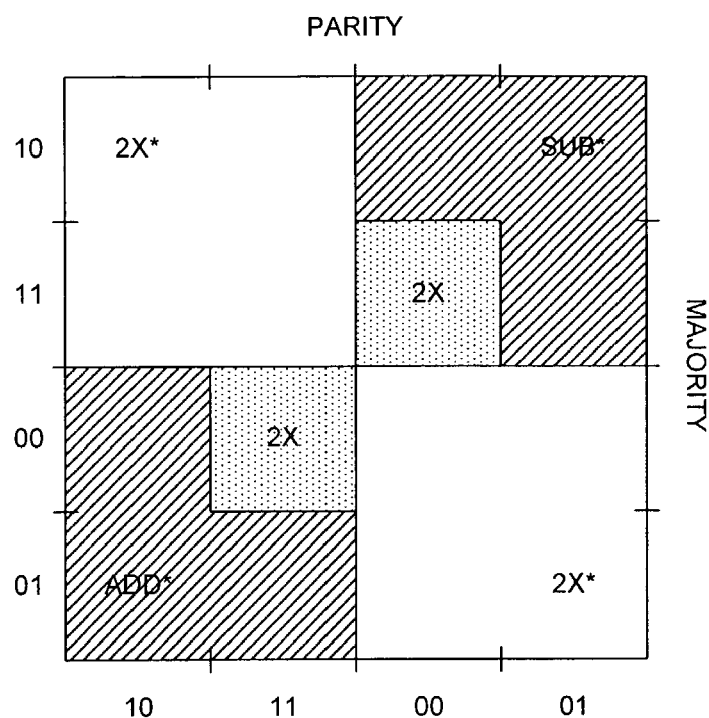
FIG. 3A illustrates a set of regions defined by higher-order bits of sum and carry words for a remainder in accordance with another embodiment of the present invention.

Because bit K+2 and bit K+1 are always the same, we can just as well omit bit K+2. Thus, bit K+1 becomes the most-significant bit. If we omit bit K+2, we can illustrate the technique by means of the inner square only. FIG. 3A illustrates Technique E, where ADD*means addition of D followed by inversion of bit K+1, SUB*means subtraction of D followed by inversion of bit K+1, 2x* means doubling followed by inversion of bit K+1, and 2× means doubling without inversion of bit K+1.

Figure 3B:
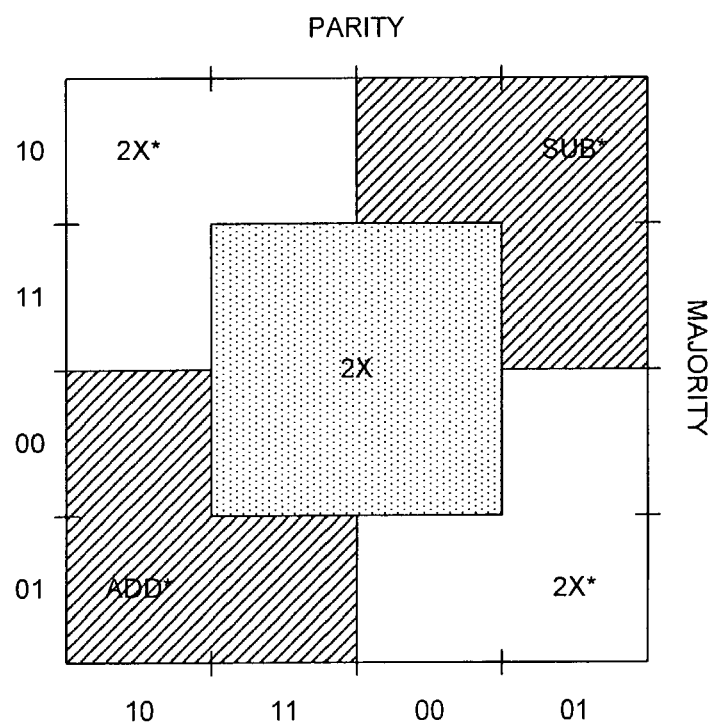
FIG. 3B illustrates a set of regions defined by higher-order bits of sum and carry words for a remainder in accordance with yet another embodiment of the present invention.

There is an alternative to Technique E, called technique F, which is illustrated in FIG. 3B. Here the region 2X is larger than in Technique E but the regions 2X* are smaller. Although the operations in Technique E and F are the same, the tests for membership in any of the regions are different. The efficiencies of the implementations of these tests may well decide which technique is fastest.

Adding or Subtracting 2*D

Figure 4A:
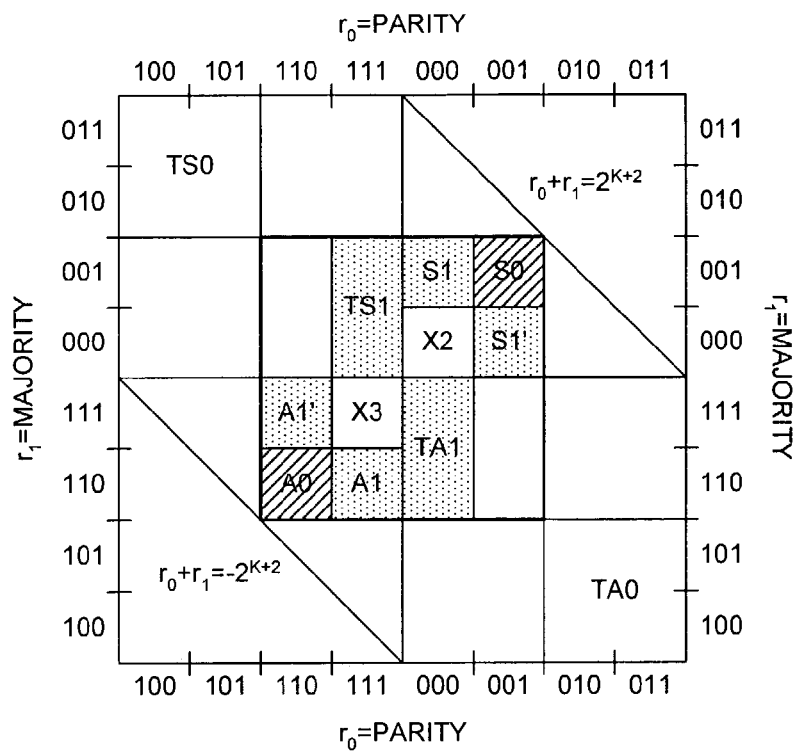
FIG. 4A illustrates the effect of carry-save addition and subtraction operations in accordance with an embodiment of the present invention.
Figure 4B:
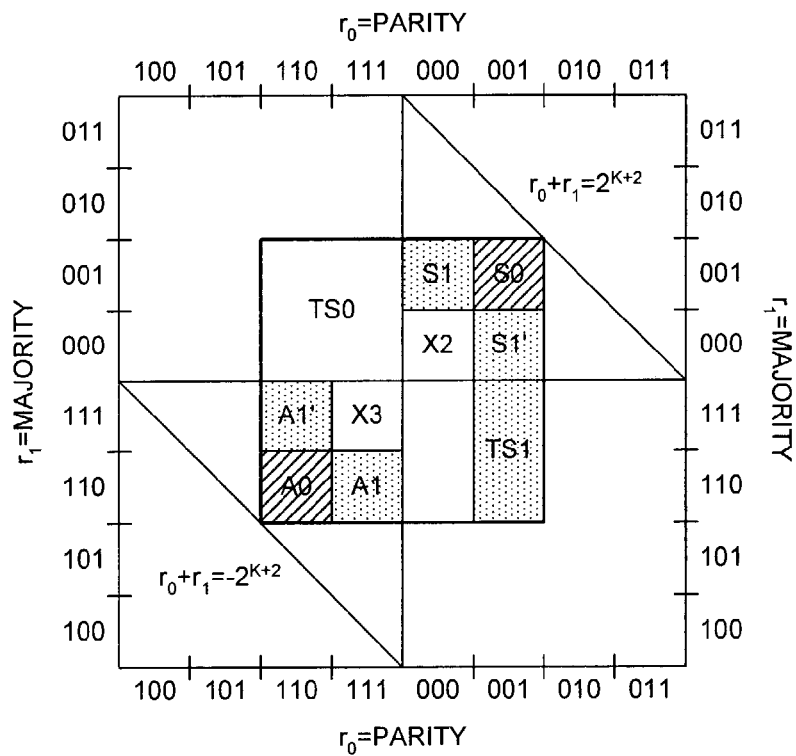
FIG. 4B the effect of carry-save addition and subtraction operations in accordance with an embodiment of the present invention.

In order to modify our carry-save division to allow for the addition or subtraction of 2*D as well as D, we distinguish the four squares S0, S1, S1', and X2 in the north-east and the four squares A0, A1, A1' and X3 in the south-west corners as illustrated in FIGS. 4A and 4B.

Subtracting D from any point in region S1 or S1' yields a point in region TS1, as illustrated in FIG. 4A. Subtracting 2*D from any point in region S0, however, yields a point in region TS0. Notice that this region is outside the bold inner square. Here is the calculation for the subtraction of 2*D. First, recall that in a two's complement representation with K+3 bits D=001x. Thus, 2*D=01x, and -2*D is represented by the bit-wise complement of 2*D plus 1 at the least-significant bit position, i.e., -2*D=10y+1, where y is the bit-wise complement of x.

| | |
|---|---|
| r0 | 001 |
| r1 | 001 |
| -2D | 10y + 1 |
| parity | 10? |
| majority | 01? |

As a consequence the result of subtracting 2*D from any point in region S0 is a point ($r_0$, $r_1$), where the two most-significant bits of $r_0$ are 10 and the two most-significant bits of $r_1$ are 01. This point lies in region TS0 of FIG. 4A.

After a translation over $(2^{K+1}, -2^{K+1})$, regions TS1 and TS0 end up inside the inner square, as illustrated in FIG. 4B. Accordingly, if each subtraction of D from points in regions S1 and S1' and each subtraction of 2*D from points in region S0 is followed by a translation over $(2^{K+1}, -2^{K+1})$, the result remains within the bold inner square.

There is another important observation that can be made from FIGS. 4A and 4B. After subtracting D or 2*D and a translation, any point in region S0, S1, or S1', ends up in region TS0 or TS1 of FIG. 4B. Because regions TS0 and TS1 are within region X2* of FIG. 3A, in the next repetition step, each of these regions may undergo a doubling and another translation. In summary, each subtraction of D from points in regions S1 or S1' and each subtraction of 2*D from points in region S0 will be followed by a translation, a doubling, and another translation, in that order.

In an implementation using only K+1 non-fractional bits, each translation is an inversion of the most significant bit and each doubling is a binary shift. In effect, a translation followed by a doubling and then another translation is the same as a doubling followed by a translation, because each doubling throws away the most significant bit. So there is no need to do a translation after an addition and before a doubling, because the bit that gets changed in the translation will be thrown away anyway in the following doubling.

For reasons of symmetry, the same reasoning applies to additions of D to points in region A1 or A1' and addition of 2*D to points in region A0. In summary, every subtraction and addition can be followed by a doubling and a translation. As a result, we obtain the following division technique.

---

Technique G:

```
q0:=0; q1:=0; c:=C; r0:=R; r1:=0; n:=0;
while (n <= K+L+2) do {
    if ((r0,r1) in 2X) then
        {r0,r1:=r0*2,r1*2; c:=c/2; n:=n+1}
    elseif ((r0,r1) in 2X*) then
        {r0,r1:=r0*2,r1*2; c:=c/2; n:=n+1;
         invert(K+1, r0, r1)}
    elseif ((r0,r1) in SUB1) then
        {r0,r1:=add(r0,r1,-D); q0,q1:=add(q0,q1, c);
         r0,r1:=r0*2,r1*2; c:=c/2; n:=n+1;
         invert(K+1, r0, r1)}
    elseif ((r0,r1) in SUB2) then
        {r0,r1:=add(r0,r1,-2*D);q0,q1:=add(q0,q1,2*c);
         r0,r1:=r0*2,r1*2; c:=c/2; n:=n+1;
         invert(K+1, r0, r1)}
    elseif ((r0,r1) in ADD1) then
        {r0,r1:=add(r0,r1, D); q0,q1:=add(q0,q1,-c);
         r0,r1:=r0*2,r1*2; c:=c/2; n:=n+1;
         invert(K+1, r0, r1)}
    elseif ((r0,r1) in ADD2) then
        {r0,r1:=add(r0,r1,2*D);q0,q1:=add(q0,q1,-2*c);
         r0,r1:=r0*2,r1*2; c:=c/2; n:=n+1;
         invert(K+1, r0, r1)}
}
```

---

Figure 5:
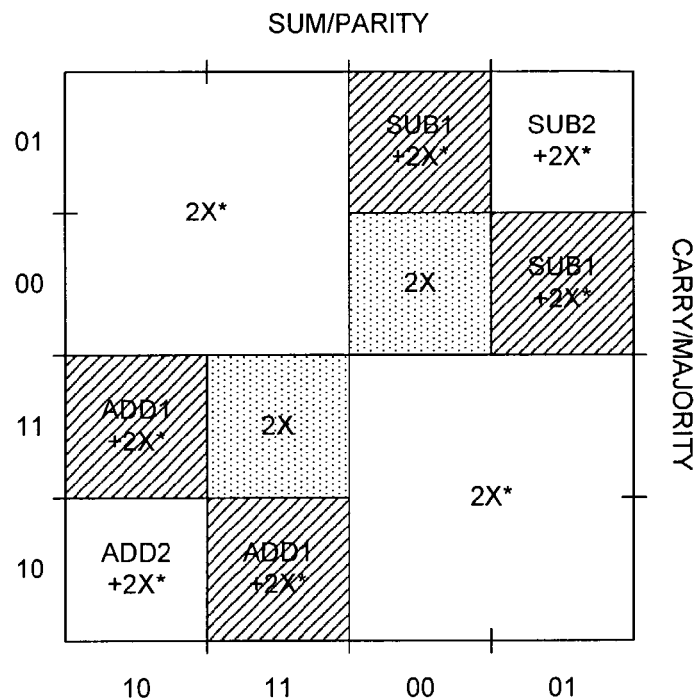
FIG. 5 illustrates a set of regions defined by higher-order bits of sum and carry words for a remainder in accordance with an embodiment of the present invention.

FIG. 5 illustrates the regions 2X, 2X*, SUB1, SUB2, ADD1, and ADD2. In region 2X, each point undergoes a doubling; in region 2X* each point undergoes a doubling followed by an inversion of the most-significant bit. In region SUB1, each point undergoes a subtraction of D followed by a doubling and finally an inversion of the most significant bit. In region SUB2, each point undergoes a subtraction of 2D followed by a doubling and finally an inversion of the most significant bit. In region ADD1, each point undergoes an addition of D followed by a doubling and finally an inversion of the most significant bit. Finally, in region ADD2, each point undergoes an addition of 2D followed by a doubling and finally an inversion of the most significant bit.

Because each addition and subtraction is followed by a doubling, this technique makes exactly K+L+3 repetition steps, which is the number of doublings necessary for each of the techniques to terminate. The tests for membership in each of the regions are simple and rely only on the two most significant bits of $r_0$ and $r_1$.

Technique H

Another technique H considers seven alternatives in each repetition step. These alternatives correspond to the regions of FIG. 6. Here the actions for region 4X* are a quadrupling of the carry and sum of the remainder and a division by four of c followed by an inversion of the most-significant bit of carry and sum of remainder. The reason for the quadrupling and inversions is as follows. Recall that the operation 2X* on a region in the northwest or in the southeast quadrant is the same as a scaling by 2X of the region with the upper left or lower right corner, respectively, as the center for the scaling. Accordingly, if a technique executes the operation 2X* twice for each of the small squares labeled 4X*, these regions map exactly to the large complete square. Finally, notice that executing the operation 2X* twice is the same as the operation 4X*, because the most-significant bits after the first 2X* operation are shifted out during the second 2X* operation. Thus, if the second operation is 2X*, it does not matter whether the first operation is a 2X operation or a 2X* operation. Incorporating the 4X* operation in Technique G gives Technique H symbolized by FIG. 6. The complete technique appears at the end of this section.

Having the regions 4X* in Technique H may reduce the total number of repetition steps. How large the reduction is depends on how often Technique H encounters a remainder in a 4X* square.

The price to pay for this potential reduction may be a small increase in the average duration of a repetition step. Because of the extra alternative, the selection logic, which determines which alternative the technique executes, becomes slightly more complex, and the extra alternative may slow down slightly some multiplexer in an implementation. The combination of these two factors may increase the duration of each repetition step slightly. Technique H will be an improvement over Technique G if the decrease in execution time due to the reduction in repetition steps is larger than the increase in execution time due to a larger average duration of the repetition step.

---

Technique H:

```
q0:=0; q1:=0; c:=C; r0:=R; r1:=0; n:=0;
while (n <= K+L+2) do {
    if(r0,r1) in 2X) then
        {r0,r1:=r0*2,r1*2; c:=c/2; n:=n+1 }
    elseif ((r0,r1) in 2X*) then
        {r0,r1:=r0*2,r1*2; c:=c/2; n:=n+1;
         invert(K+1, r0, r1)}
    elseif ((r0,r1) in 4X*) then
        {r0,r1:=r0*4,r1*4; c:=c/4; n:=n+1;
         invert(K+1, r0, r1)}
    elseif ((r0,r1) in SUB1) then
        {r0,r1:=add(r0,r1,-D);q0,q1:=add(q0,q1, c);
         r0,r1:=r0*2,r1*2; c:=c/2; n:=n+1;
         invert(K+1, r0, r1)}
    elseif ((r0,r1) in SUB2) then
        {r0,r1:=add(r0,r1,-2*D);q0,q1:=add(q0,q1, 2*c);
         r0,r1:=r0*2,r1*2; c:=c/2; n:=n+1;
```

-continued

Technique H:

```
    invert(K+1, r0, r1)}
  elseif ((r0,r1) in ADD1) then
    {r0,r1:=add(r0,r1, D);q0,q1:=add(q0,q1,-c);
    r0,r1:=r0*2,r1*2; c:=c/2; n:=n+1;
    invert(K+1, r0, r1)}
  elseif ((r0,r1) in ADD2) then
    {r0,r1:=add(r0,r1,2*D);q0,q1:=add(q0,q1,-2*c);
    r0,r1:=r0*2,r1*2; c:=c/2; n:=n+1;
    invert(K+1, r0, r1)}
}
```

Implementations

Figure 7:
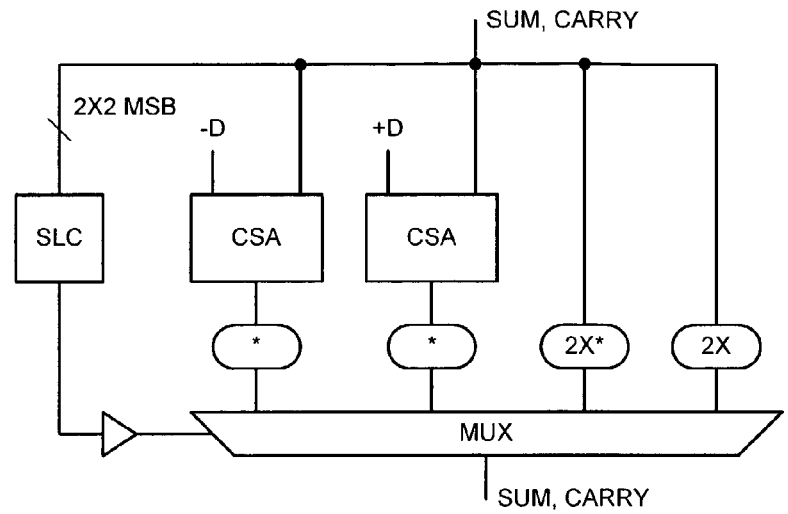
FIG. 7 illustrates a possible hardware implementation of a carry-save division circuit in accordance with an embodiment of the present invention.
Figure 8:
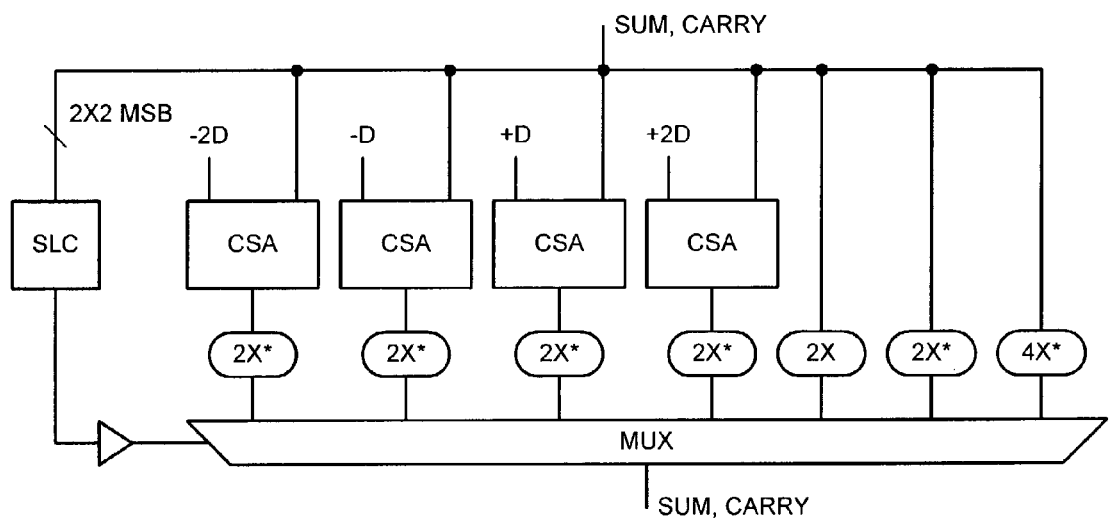
FIG. 8 illustrates another possible hardware implementation of a carry-save division circuit in accordance with an embodiment of the present invention.
Figure 9:
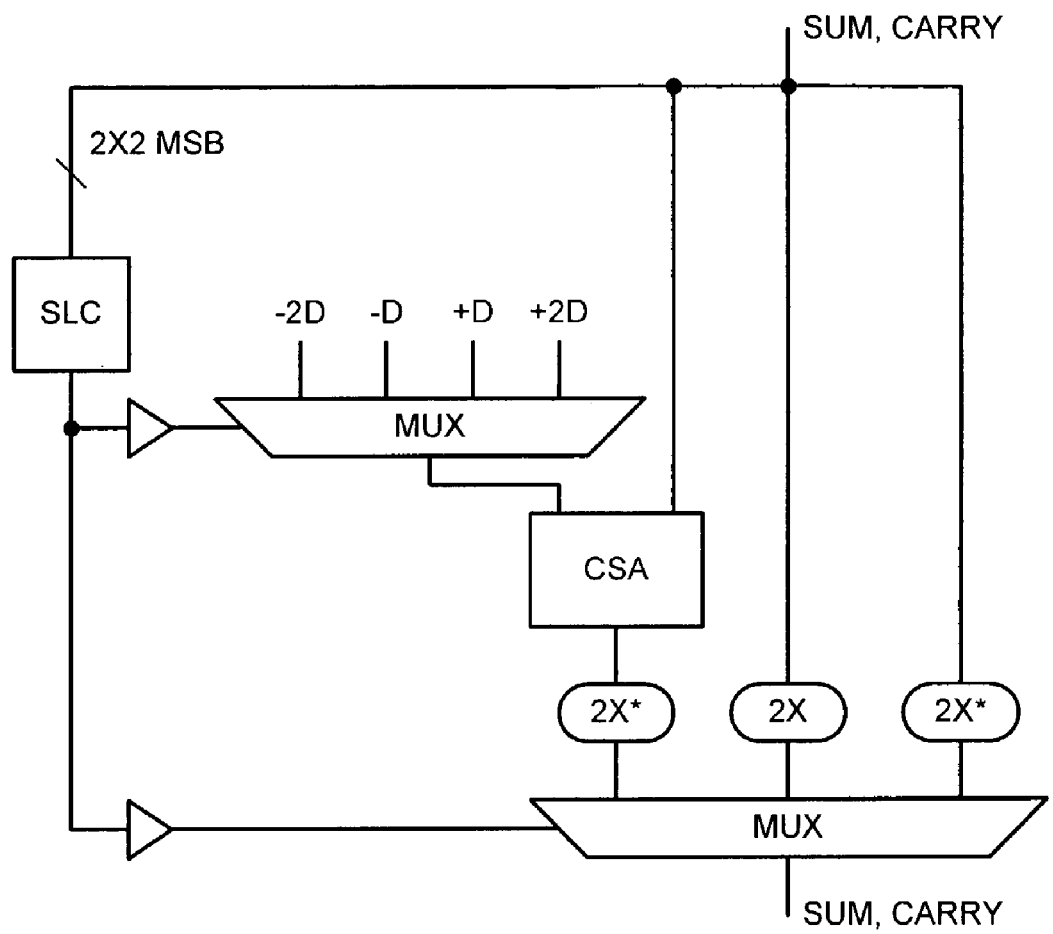
FIG. 9 illustrates yet another possible hardware implementation of a carry-save division circuit in accordance with an embodiment of the present invention.

FIGS. 7-9 present implementations of three of the above-described division techniques illustrating the operations on the remainder. All of these figures provide a rough schematic showing the elementary modules in an implementation. These modules are a carry-save adder, indicated by "CSA," a multiplexer, indicated by a trapezoid labeled MUX, the selection logic, indicated by SLC, and the implementations of the other actions of the techniques, indicated by 2X, 2X*, 4X*, or just *. An oval with a single star (*) represents the implementation that only inverts the most-significant bit of the sum and carry. An oval with the label 2X* implements a left-shift by one followed by an inversion of the most significant bit of sum and carry. An oval with the label 2X represents just a left-shift by one.

These figures do not show the accumulation of quotient digits or any other operations on the quotient. The figures also do not show implementations of any post-processing steps, like the implementation of any restoration step, rounding, or conversion that must occur for the quotient after termination of the technique. These may be implemented using any one of a number of standard techniques.

FIG. 7 shows an implementation of Technique E. This implementation includes two carry-save adders (one for adding D and one for adding –D) and a 4-to-1 multiplexer. FIG. 3A represents the regions that must be detected by the corresponding selection logic to provide the correct input to the multiplexer. Technique F can be implemented in a similar manner.

Although the implementation shows a 4-to-1 multiplexer, the actual implementation may be closer to a 3-to-1 multiplexer. Recall that the results of the operations 2X and 2X* are the same except for the most significant bit of sum and carry. Thus, the equivalent parts of the 2X and 2X* inputs of the multiplexer can be combined. This merging also reduces the capacitance on the select input of the multiplexer.

Figure 6:
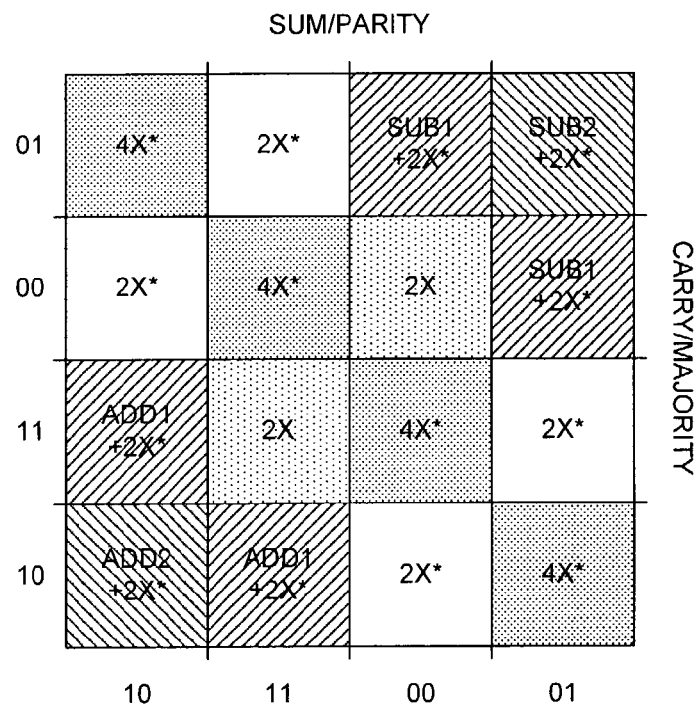
FIG. 6 illustrates a set of regions defined by higher-order bits of sum and carry words for a remainder in accordance with another embodiment of the present invention.

FIG. 8 illustrates an implementation of Algorithm H. This implementation includes four carry-save adders for adding –2D, –D, +D, or +2D, and a 7-to-1 multiplexer. FIG. 6 illustrates the regions that must be detected by the selection logic. The oval with label 4X* implements a left-shift by two followed by an inversion of the most significant bit of sum and carry. Similar to the previous implementation, the 7-to-1 multiplexer can be implemented with a component that is almost a 6-to-1 multiplexer.

FIG. 9 illustrates an implementation of Technique G. It uses two multiplexers, one 4-to-1 multiplexer for the input to a single carry-save adder, and a 3-to-1 multiplexer to produce the final output. As with the previous two implementations, this last multiplexer is almost a 2-to-1 multiplexer.

Technique G can also be implemented in the manner illustrated in FIG. 8, where there is only one large multiplexer.

However, splitting the multiplexer in two parts, as illustrated in FIG. 9, may have some advantages. First, the implementation illustrated in FIG. 9 uses only one carry-save adder, whereas implementation illustrated in FIG. 8 uses four carry-save adders, which consume a significant amount of area and energy. Second, the implementation of FIG. 9 avoids a large fan-in and a large fan-out for the final multiplexer, assuming that stages are cascaded. The large fan-in and fan-out with one multiplexer slows down the critical path for all of the alternatives. Splitting the multiplexer into two decreases the critical path delay for the alternatives that exclude the carry-save adder and it increases the critical path delay for the alternatives that include the carry-save adder. Increasing the difference between path delays for the respective alternatives may be bad for a synchronous circuit implementation, but an asynchronous implementation may be able to take advantage of this difference by achieving an average-case delay that is less than the critical path delay of the implementation with the large multiplexer. This situation may apply if the alternatives that exclude carry-save addition occur more frequently than the alternatives that include carry-save addition.

The selection logic for each of the implementations is simple. As an example, we present the equations for FIG. 5, where we assume that $c_0$ and $c_1$ are the most and second-most significant bit of the carry respectively, and $s_0$ and $s_1$ are the most and second-most significant bit of the sum respectively. Below, the notation $\oplus$ denotes XOR.

$$2X^* = s_0 \oplus c_0$$

$$2X = s_0 s_1 c_0 c_1 + \overline{s_0 s_1 c_0 c_1}$$

$$SUB1 = \overline{s_0 s_1 c_0 c_1} + \overline{s_0} s_1 \overline{c_0 c_1}$$

$$SUB2 = \overline{s_0} s_1 \overline{c_0} c_1$$

$$ADD1 = s_0 s_1 c_0 \overline{c_1} + s_0 \overline{s_1} c_0 c_1$$

$$ADD2 = s_0 \overline{s_1} c_0 \overline{c_1}$$

Figure 10:
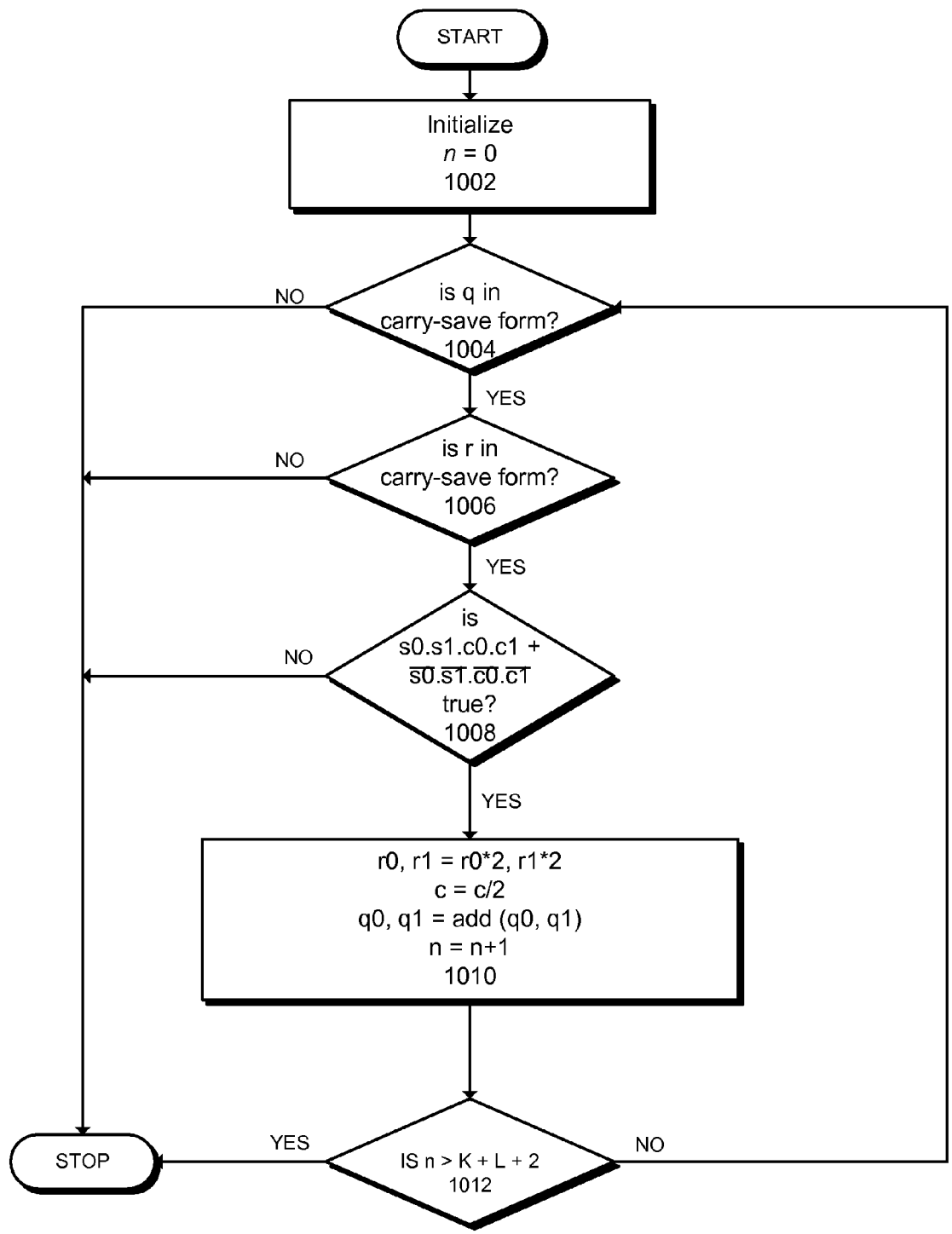
FIG. 10 is a flowchart illustrating the process for performing a carry-save division operation that eliminates the need for carry propagation in performing the division operation.

FIG. 10 is a flowchart that illustrates the process of using the selection logic presented above for performing the carry-save division operation. K defines the ranges for R, D, and C, such that R lies in $[-2^{K+1}, 2^{K-1})$, D lies in $[2^K, 2^{K-1})$, and C lies in $[, 2^{K+1})$. L defines the desired accuracy in the computed quotient, Q, such that the error in the approximated Q is less than $2^L$. The method starts with initializing the number of iterations performed, n, to 0 (step 1002). Next, when the quotient calculated thus far, q, is maintained in a carry-save form (step 1004), i.e., as a sum component, q0, and a carry component, q1; and when r is maintained in a carry-save form (step 1006), i.e., as a sum component r0, and a carry component, r1, then the logic relationship s0·s1·c0·c1+$\overline{s0}$·$\overline{s1}$·$\overline{c0}$·$\overline{c1}$ is checked (step 1008). When the relationship is true, both higher order bits of the remainder, r0 and r1, are multiplied by 2, and c is divided by 2. Here, r is related to the quotient calculated thus far, q, and a coefficient, c, by the relationship, q*D+c*r=N (step 1010). The value of n, the number of iterations, is incremented after each iteration, and the iterations proceed while n<=K+L+2 (step 1012).

CONCLUDING REMARKS

All of the above-described techniques are easy to implement by a synchronous or asynchronous circuit. Techniques E and F take more repetition steps to terminate than Technique G. How many more repetition steps these techniques need depends on the number of additions and subtractions that the technique executes. We expect the number of additions and subtractions as a fraction of the number of doublings will be around 0.5, based on some quick calculations and assuming uniform distributions. This means that we expect that for every two doublings there will be one addition or subtraction. Simulations will show what the exact fraction is. Because Techniques E and F execute each addition and subtraction in a repetition step separate from a doubling, Technique E and F execute 50% more repetition steps than Technique G, if the number of additions and subtractions per doubling is 0.5. Although the Technique G executes fewer repetition steps, this technique needs to consider six alternatives in each repetition step, whereas Technique E and F need to consider four alternatives only. The number of alternatives to be considered in each repetition step may have some effect on the execution time of the repetition step.

There are two ways in which the above-described techniques can be generalized. Both generalizations consider the three most significant bits of sum and carry, which means there will be 64 small squares instead of 16. In one generalization, the divisor D is of the form D=01 . . . and in the other generalization D is of the form D=001 . . . . In both cases, the action for each of the squares is some combination of the actions 2X*, 4X*, 8X*, 2X, 4X, SUB1, SUB2, SUB3, SUB4, ADD1, ADD2, ADD3, and ADD4. We have not pursued any of these generalizations nor do we know whether the extra delay in a repetition step due to the extra complexity in selection logic, larger multiplexers, and larger drivers will be compensated by a further reduction in repetition steps.

We also have not discussed any other optimizations, such as overlapping quotient-selection of successive stages, overlapping remainder formation of successive stages, or any hybrid of these optimizations. These techniques can be applied to all implementations.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A circuit that performs a carry-save division operation, wherein the carry-save division operation divides a numerator, N, where N=C*R, by a denominator, D, to produce an approximation of a quotient, Q=N/D, the circuit comprising: circuitry for approximating Q iteratively, and circuitry for performing selection logic, wherein:
   the circuitry for approximating Q iteratively is configured to approximate Q by iteratively selecting an operation to perform based on higher order bits of a remainder, r, and then performing the operation;
   wherein K defines the ranges for R, D, and C, such that R lies in $[-2^{K+1}, 2^{K+1})$, D lies in $[2^K, 2^{K+1})$, and C lies in $[0, 2^{K+1})$;
   wherein L defines the desired accuracy in the computed quotient, Q, such that the error in the approximated Q is less than $2^L$;
   wherein the number of iterations performed, n, initialized as n=0, and incremented by 1 after each iteration, depends on the relationship, n−=K+L+2;
   wherein q, the quotient calculated thus far is maintained in a carry-save form, wherein the carry-save form involves maintaining a sum component, q0, and a carry component, q1; and
   the remainder, r, is maintained in a carry-save form, wherein the carry-save form involves maintaining a sum component r0, and a carry component, r1, such that
      s0 is the most significant bit of r0,
      $\overline{s0}$ is the negation of s0;
      s1 is the second most significant bit of r0,
      $\overline{s1}$ is the negation of s1,
      c0 is the most significant bit of r1,
      $\overline{c0}$ is the negation of c0;
      c1 is the second most significant bit of r1; and
      $\overline{c1}$ is the negation of c1; and
   the circuitry for performing selection logic is configured to determine the value of the logic relationship, $s0 \cdot s1 \cdot c0 \cdot c1 + \overline{s0} \cdot \overline{s1} \cdot \overline{c0} \cdot \overline{c1}$;
   wherein the circuitry for approximating Q iteratively is further configured such that:
      when the value returned by the circuitry for performing selection logic for the logic relationship, $s0 \cdot s1 \cdot c0 \cdot c1 + \overline{s0} \cdot \overline{s1} \cdot \overline{c0} \cdot \overline{c1}$, is true, then the circuitry for approximating Q iteratively performs an operation on the higher order bits of the remainder, r, wherein r is related to the quotient calculated thus far, q, and a coefficient, c, by the relationship, q*D+c*r=N;
   wherein the operation involves multiplying both r0 and r1 by 2, and dividing c by 2; and wherein after the iterations are complete, performing a carry completion addition that adds q0 and q1 to produce Q in a non-redundant form;
   whereby the operation eliminates the need for carry propagation and thereby speeds up the division operation.

2. The circuit of claim 1, wherein the circuitry for approximating Q iteratively is further configured to initialize r, q and c;
   wherein initializing r involves setting r0=R and r1=0;
   wherein initializing q involves setting q0=0 and q1=0; and
   wherein initializing c involves setting c=1.

3. The circuit of claim 1, wherein the circuitry for performing selection logic is further configured such that when the logic relationship
   $(s0 \cdot \overline{c0} + \overline{s0} \cdot c0) \cdot (s1 \cdot c1 + \overline{s1} \cdot \overline{c1})$ is true, then the operation additionally includes multiplying both r0 and r1 by 2, dividing c by 2 and then inverting the most significant bits of r0 and r1.

4. The circuit of claim 1, wherein the circuitry for performing selection logic is further configured such that when the logic relationship $(s0 \cdot \overline{c0} + \overline{s0} \cdot c0) \cdot (s1 \cdot \overline{c1} + \overline{s1} \cdot c1)$ is true, then the operation additionally includes multiplying both r0 and r1 by 4, dividing c by 4 and then inverting the most significant bits of r0 and r1.

5. The circuit of claim 1, wherein the circuitry for performing selection logic is further configured such that when the logic relationship $(\overline{s0} \cdot \overline{s1} \cdot \overline{c0} \cdot c1 + \overline{s0} \cdot s1 \cdot \overline{c0} \cdot \overline{c1})$ is true, then the operation additionally includes subtracting D from r0 and r1, adding c to q0 and q1, multiplying both r0 and r1 by 2, dividing c by 2 and then inverting the most significant bits of r0 and r1.

6. The circuit of claim 1, wherein the circuitry for performing selection logic is further configured such that when the logic relationship $(\overline{s0} \cdot s1 \cdot \overline{c0} \cdot c1)$ is true, then the operation additionally includes subtracting 2D from r0 and r1, adding 2c to q0 and q1, multiplying both r0 and r1 by 2, dividing c by 2 and then inverting the most significant bits of r0 and r1.

7. The circuit of claim 1, wherein the circuitry for performing selection logic is further configured such that when the logic relationship $(s0 \cdot s1 \cdot c0 \cdot \overline{c1} + s0 \cdot \overline{s1} \cdot c0 \cdot c1)$ is true, then the operation additionally includes adding D to r0 and r1, subtracting c from q0 and q1, multiplying both r0 and r1 by 2, dividing c by 2 and then inverting the most significant bits of r0 and r1.

8. The circuit of claim 1, wherein the circuitry for performing selection logic is further configured such that when the logic relationship ($s0 \cdot \overline{s1} \cdot c0 \cdot \overline{c1}$) is true, then the operation additionally includes adding 2D to r0 and r1, subtracting 2c from q0 and q1, multiplying both r0 and r1 by 2, dividing c by 2 and then inverting the most significant bits of r0 and r1.

* * * * *

UNITED STATES PATENT AND TRADEMARK OFFICE
CERTIFICATE OF CORRECTION

PATENT NO. : 7,660,842 B2  Page 1 of 1
APPLICATION NO. : 10/436577
DATED : February 9, 2010
INVENTOR(S) : Ebergen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 832 days.

Signed and Sealed this

Thirtieth Day of November, 2010

David J. Kappos
*Director of the United States Patent and Trademark Office*